United States Patent [19]

Yamaoka et al.

[11] Patent Number: 4,916,606
[45] Date of Patent: Apr. 10, 1990

[54] PIPELINED PARALLEL DATA PROCESSING APPARATUS FOR DIRECTLY TRANSFERRING OPERAND DATA BETWEEN PRECEDING AND SUCCEEDING INSTRUCTIONS

[75] Inventors: Akira Yamaoka, Hadano; Kenichi Wada, Zama; Kazunori Kuriyama, Hadano; Yooichi Shintani, Kokubunji, all of Japan

[73] Assignee: Hitachi, Ltd., Tokyo, Japan

[21] Appl. No.: 75,528

[22] Filed: Jul. 20, 1987

Related U.S. Application Data

[63] Continuation of Ser. No. 627,922, Jul. 5, 1984.

[30] Foreign Application Priority Data

Jul. 8, 1983 [JP] Japan ................................ 58-123246

[51] Int. Cl.[4] .......................... G06F 9/34; G06F 9/38; G06F 9/26
[52] U.S. Cl. ................................. 364/200; 364/262.4; 364/263; 364/246; 364/246.3; 364/231.9; 364/231.8
[58] Field of Search ... 364/200 MS File, 900 MS File

[56] References Cited

U.S. PATENT DOCUMENTS

| 4,398,245 | 8/1983 | Fujita ........................... 364/200 |
| 4,476,525 | 10/1984 | Ishii ............................ 364/200 |
| 4,541,047 | 9/1985 | Wada et al. ................. 364/200 |
| 4,638,429 | 1/1987 | Watabe et al. ............... 364/200 |

Primary Examiner—Archie E. Williams, Jr.
Assistant Examiner—Emily Y. Chan
Attorney, Agent, or Firm—Antonelli, Terry & Wands

[57] ABSTRACT

A data processing apparatus of processing first instruction of a type in which the result of operation of the first instruction is stored in at least one storage location designated by operands of the first instruction and second instruction of a type which succeeds to the first instruction and makes use of the result of operation of the first instruction as operand data. The apparatus comprises an OSC control circuit for detecting whether at least a part of the result of operation of the first instruction is to be used or not as the operand data for the second instruction, and an arithmetic unit for allowing the result of operation of the first instruction to be directly used as the operand data for the second instruction when the OSC control circuit detects the given condition is fulfilled.

12 Claims, 8 Drawing Sheets

FIG. 2a    PRIOR ART

```
INSTRUCTION 1   D A L E E P S
INSTRUCTION 2     D A   L E E P S
INSTRUCTION 3       D A     L E E P S
INSTRUCTION 4         D A       L E E P S
                                 ⏟
                              2-CYCLE PITCH
```

FIG. 2b    PRIOR ART

```
INSTRUCTION 1  D A L E E P S
INSTRUCTION 2    D A         L E E P S
INSTRUCTION 3      D A             L E E P
INSTRUCTION 4        D A
                         ⏟
                      5-CYCLE PITCH
```

FIG. 2c

```
INSTRUCTION 1   D A L E E P S
INSTRUCTION 2    D' D A L E E P S
INSTRUCTION 3      D' D A L E E P S
INSTRUCTION 4        D' D A L E E P S
                         ⏟
                      2-CYCLE PITCH
```

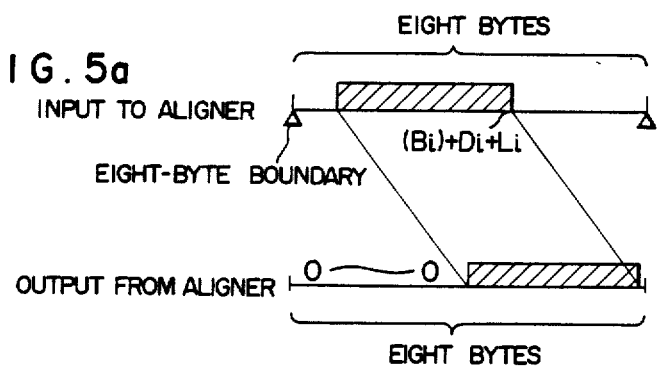
F I G. 5a
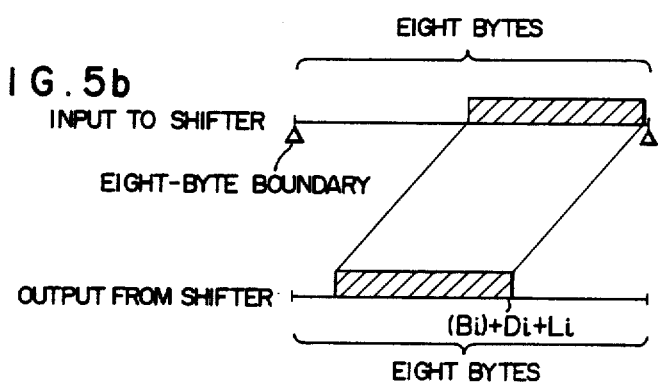
F I G. 5b

PIPELINED PARALLEL DATA PROCESSING APPARATUS FOR DIRECTLY TRANSFERRING OPERAND DATA BETWEEN PRECEDING AND SUCCEEDING INSTRUCTIONS

This is a continuation of application Ser. No. 627,922 filed July 5, 1984, now abandoned.

BACKGROUND OF THE INVENTION

The present invention relates generally to a method of processing data by using a storage unit for storing operand information required for executing instructions. The invention also concerns an apparatus or system for carrying out the method, wherein the apparatus is equipped with the storage unit for storing the operand information for executing the instructions.

Referring to FIG. 1 of the accompanying drawings, there is illustrated in the register 10 a format of a storage-to-storage instruction, i.e. an instruction of the type according to which two operand data to be used for an arithmetic operation are stored in a storage and the result of the operation is also placed in the storage. Hereinafter, the instruction of this kind will be referred to as an SS instruction. In FIG. 1, a symbol OP represents an operation code of the SS instruction, $L_1$ and $L_2$ represent length codes indicative of the lengths of the two operands, $B_1$ and $B_2$ represents the numbers of the general purpose registers (or base registers) used for address determination, and $D_1$ and $D_2$ represent displacements.

The leftmost byte address (or leading address) of a first operand is determined as the sum of $(B_1)+D_1$, while the rightmost byte address (or trailing address) of the operand is determined as the sum of $(B_1)+D_1+L_1$, wherein $(B_1)$ represents the contents of the general or base register. In the similar manner, the leading address of a second operand is determined as the sum of $(B_2)+D_2$ with the trailing address thereof being determined as the sum of $(B_2)+D_2+L_2$. These addresses are logical addresses. The arithmetic operation is executed on the basis of the first and second operands, the result of which is loaded in the storage location of the first operand.

FIG. 2a of the accompanying drawings illustrates a flow of successive operations of the SS instructions in a computer of a pipeline control type. In the figure, D, A, L, E, P and S designate different steps or stages of the pipeline processings. It will be noted that processings of the different instructions are sequentially initiated every cycle so that a plurality of instructions can be processed in parallel.

At the stage D, decoding of the instruction and the addition for determining the logical addresses of the operands are performed. At the stage A, the logical addresses of the operands thus determined are translated into corresponding real addresses. At the stage L, the operand data are read out from buffer memory. At the stage E, arithmetic operation or calculation is executed by using the operand data thus obtained. At the stage P, the logical address for storing the result of operation or calculation is translated into the real address. At the stage S, the result of the arithmetic operation or calculation is written in a buffer memory. These stages D, A, L, E, P and S are under the control of a stage control circuit which will be described hereinafter.

In general, in the case of the SS instruction, the operand length is often longer. Further, many of the instructions require rather complicated processings. As a consequence, two or more cycles are required for the arithmetic processing performed at the stage E. In FIG. 2a, it is assumed that a succession of the instructions 1 to 4 each require two cycles for the processings at the stage E. Accordingly, the arithmetic operation of the instruction is processed at the pitch or rate of two cycles at the stage E.

It will be understood that in the case of the data processing unit of the pipeline control type, the processings for a plurality of instructions proceed in an overlapping relation. Consequently, there may arise such a situation in which the reading or fetching of the operand for a succeeding instruction is to be effected in precedence to the writing of the operand for a preceding instruction, e.g. the stage L for the succeeding instruction (for example, instruction 2) precedes the stage S for the preceding instruction (e.g. instruction 1). Under this circumstance, in the case of a data processing unit or system of such an architecture in which a sequential order is maintained in the processings of the instructions, there may arise such a situation in which the operand for a succeeding instruction is to be read out or fetched from a storage location in the course of execution of a preceding instruction or in precedence to data alteration of the storage location which is requested by an execution awaiting instruction. In such a situation, the contradiction or conflict must be detected to thereby cause the operand fetch for the succeeding instruction to be delayed until the data alteration or change of the storage location for the preceding instruction has been completed. More specifically, in the case of the above mentioned example, execution of the stage L for the succeeding instruction has to be delayed until the processing at the stage S for the preceding instruction has been completed, to thereby avoid the possibility of a conflict. This type of processing is generally referred to as OSC (Operand Store Compare) event.

When the condition for the OSC event mentioned above takes place, the operand fetch for the succeeding instruction will have to be delayed until the processing for dealing with the OSC event has been performed, as described above, which means that the pipeline processing is disturbed or adversely influenced, thereby degrading the performance of the data processing unit. FIG. 2b illustrates a situation in which the processings for the OSC event must be performed for all the instructions 1 to 4 shown in FIG. 2a. More specifically, the storage data to be changed by executing the instruction 1 is required by the instruction 2, the storage data to be changed or altered for the execution of the instruction 2 is required by the instruction 3 and so on.

Under the circumstance illustrated in FIG. 2b, the instructions are each processed at the pitch or rate of five cycles. Accordingly, the case illustrated in FIG. 2b involves degradation in the performance corresponding to three cycles when compared with the case described above in conjunction with FIG. 2a.

SUMMARY OF THE INVENTION

It is therefore an object of the present invention to provide data processing method and device which allows disturbance in the pipelined processings due to occurrence of the OSC event to be reduced.

In particular, with the present invention, it is contemplated to provide a data processing method and device in which an operation for a succeeding instruction can be initiated without waiting for the writing of the result of the operation for a preceding instruction in a storage by transferring storage data changed or altered by the preceding instruction directly to the succeeding instruction upon execution thereof without being transferred via the storage.

In view of the above objects, there is proposed according to a feature of the invention a data processing method in which a first instruction of the type for storing the result of operation at least at one storage location designated by an operand is made use of together with a second instruction of the type which follows the first instruction and utilizes as the operand data the result of the operation executed for the first instruction; comprising a step of detecting or determining whether or not at least a part of the result of the operation executed for the first instruction is to be utilized as the operand data for the second instruction and, a step of controlling in which upon detection at the detecting step of the condition that the result of the operation executed for the first instruction is to be utilized, the result of the operation for the first instruction is made use of directly as the operand data for the second instruction.

The invention also provides an apparatus for carrying out the method.

In the following, the preferred embodiments of the present invention will be described in detail by referring to the accompanying drawings.

BRIEF DESCRIPTION OF THE DRAWINGS

FIGS. 2a and 2b are time charts for illustraing examples of hitherto known processings performed upon absence and occurrence of the OSC event;

FIG. 2c is a time chart for illustrating exemplary operation or processing based on the teaching of the invention;

FIG. 5a is a view for illustrating, by way of example, the operation of aligners (36) and (37) shown in FIG. 3;

FIG. 5b is a view for illustrating, by way of example, the operation of a shifter (460) shown in FIG. 6;

DESCRIPTION OF THE PREFERRED EMBODIMENTS

To being with, the basic concept underlying the embodiment of the invention will be elucidated as follows.

When the instruction which requires two or more cycles for the execution thereof is decoded, the decoding of a succeeding instruction is delayed by one cycle, whereupon the processing is carried out for detecting the OSC event between the instant instruction and the succeeding instruction as well as between the preceding one to the instant instruction and the succeeding instruction. Upon detection of the OSC event at a stage D', (i) the reading or fetching of the operands for the succeeding instruction is not delayed even when the conventional OSC detecting circuit detects the OSC event, and (ii) the arithmetic unit or accumulator makes use of the result of the operation performed for the preceding instruction as the operand data for the succeeding instruction instead of fetching or reading out the data from the storage.

To this end, there is provided in the accumulator or arithmetic unit a data register for effecting the transfer of the result of operation performed for the preceding instruction to the execution of the succeeding instruction. Additionally, the data which is expected to be required by the succeeding instruction is aligned with respect to the byte position and placed in the data register.

In the following description of the exemplary embodiments of the invention, it is assumed that the inventive concept is applied to the processing of decimal instructions above all among the SS instructions.

FIG. 2c is a view similar to FIG. 2b and illustrates the processing taught by the invention for the case where the OSC event is assumed to take place for all four instructions 1 to 4. A description in conjunction with the individual processing stages is as follows.

Figure 1:
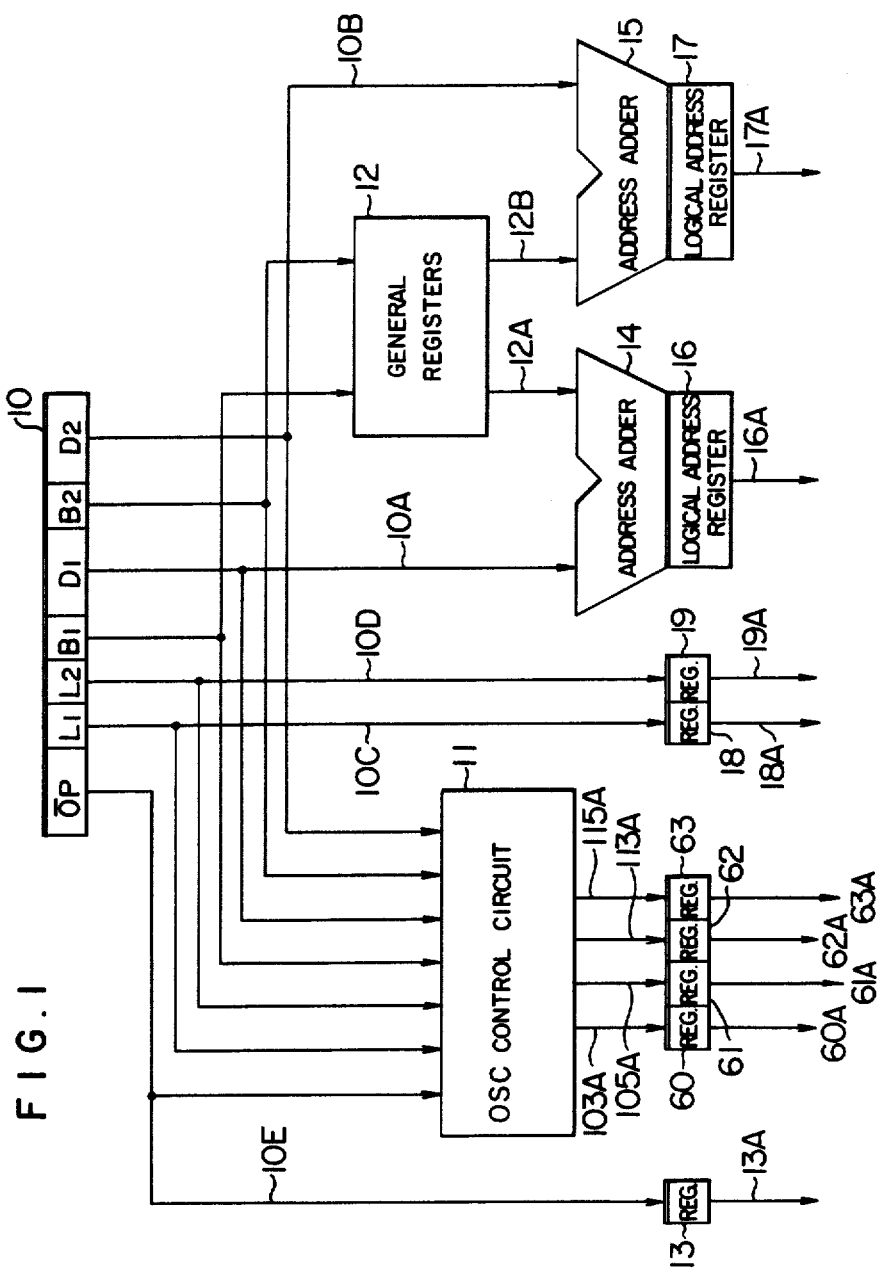
FIGS. 1 and 3 in combination show in block diagram a circuit arrangement of a data processing device according to an exemplary embodiment of the present invention.

Referring to FIG. 1, when an instruction code is placed in the instruction register unit 10, the contents of the base registers designated by $B_1$ and $B_2$ are read out from general purpose registers 12 onto lines 12A and 12B, respectively, at the stage D, resulting in the arithmetic operations of $(B_1)+D_1$ and $(B_2)+D_2$ being performed by address adders 14 and 15, respectively, on the basis of the above contents $B_1$ and $B_2$ and the displacements $D_1$ and $D_2$ which are read out on lines 10A and 10B, respectively. The results of the additions are placed in logical address registers 16 and 17, respectively. The length codes $L_1$ and $L_2$ are loaded in registers 18 and 19 by way of lines 10C and 10D, respectively, while the operation code OP is loaded in a register 13 through a line 10E. Further, the instruction code contained in the instruction register unit 10 is fed to an OSC control circuit 11 provided according to the teaching of the invention.

Figure 7:
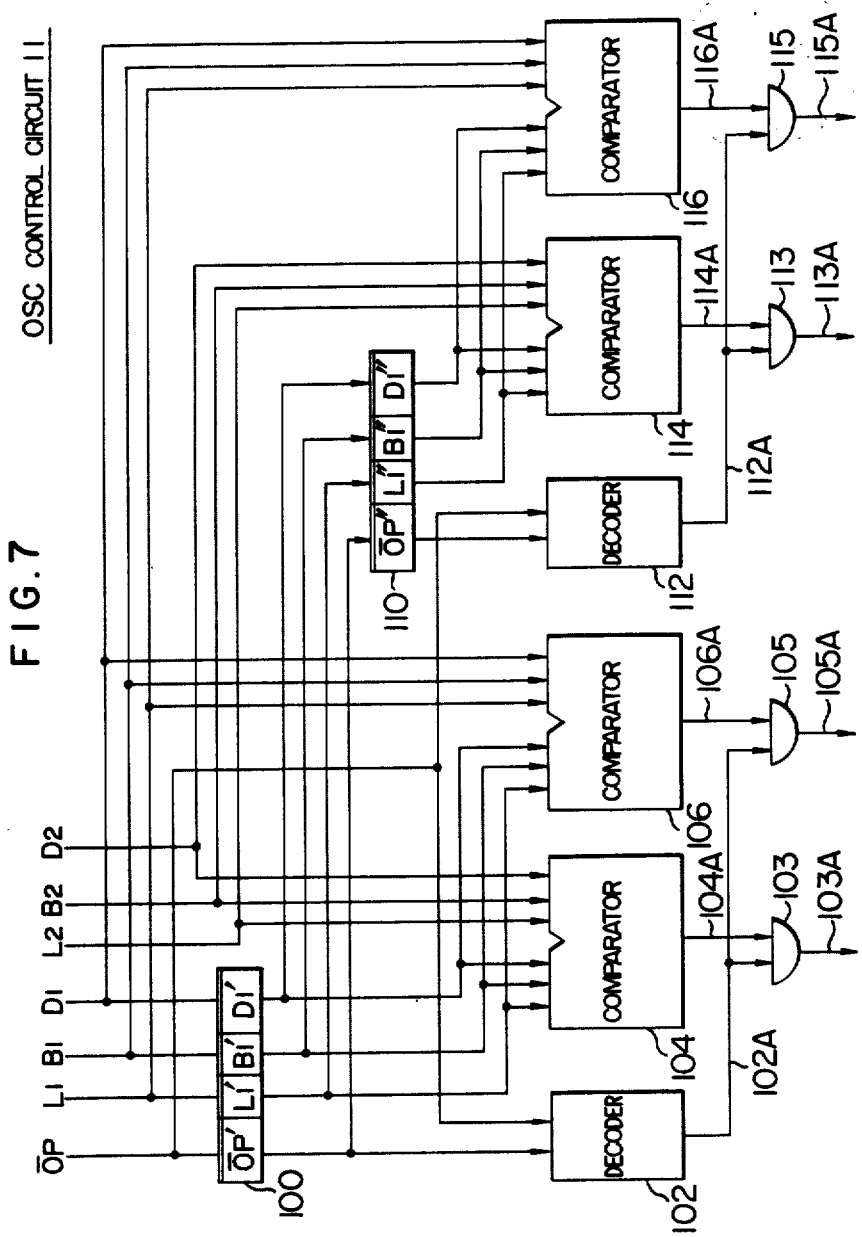
FIG. 7 shows in a block diagram an exemplary embodiment of an OSC control circuit (11) shown in FIG. 1.

FIG. 7 is a block diagram showing a typical configuration of the OSC control circuit 11. Referring to the figure, a register 100 is loaded with an operation code OP' of the instruction in concern, a length code $L_1'$ of a first operand, a base register number $B_1'$ and a displacement $D_1'$ placed previously in the register 10 in synchronism with the stage D. Additionally, the contents placed previously in the register 100 are transferred to another register 110 to be loaded therein in synchronism with the stage D. In this manner, the contents of the instruction register unit 10 are sequentially transferred to the register 100 and hence to the register 110 at every stage D of instruction processing.

Assuming that the instruction code represents a decimal instruction, the stage D of the succeeding instruction is not initiated in the next cycle but the operation at the stage D' is activated, whereby comparison is performed among the instant decimal instruction (exemplified by the instruction 2), an instruction decoded in precedence (exemplified by the instruction 1) and an instruction code to be succeedingly decoded (exemplified by the instruction 3) in the manner mentioned below.

On the above conditions, the operation codes and others of the instructions 1, 2 and 3 are placed in the registers 110, 100 and 10, respectively.

With the aid of decoders 102 and 112 shown in FIG. 7, the operation code OP of the instruction 3 is compared with the operation codes OP' and OP'' of the instructions 2 and 1, respectively, to determine the combination of the instructions whose execution involves the result of operation which can be transferred. If such combination is found, output lines 102A and 112A are set to logic "1", respectively. On the other hand, a comparator circuit 104 performs comparisons for determining if $L_1' \geq L_2$, $B_1' = B_2$ and $L_1' + D_1' = L_2 + D_2$. In case all these conditions are satisfied, the output line 104a is set to logic "1". Thus, AND circuits 103, 105, 113 and 115 are enabled to produce logic "1" on output lines 103A, 105A, 113A and 115A, respectively. The operation at the stage D' is performed in the manner described above.

Figure 8:
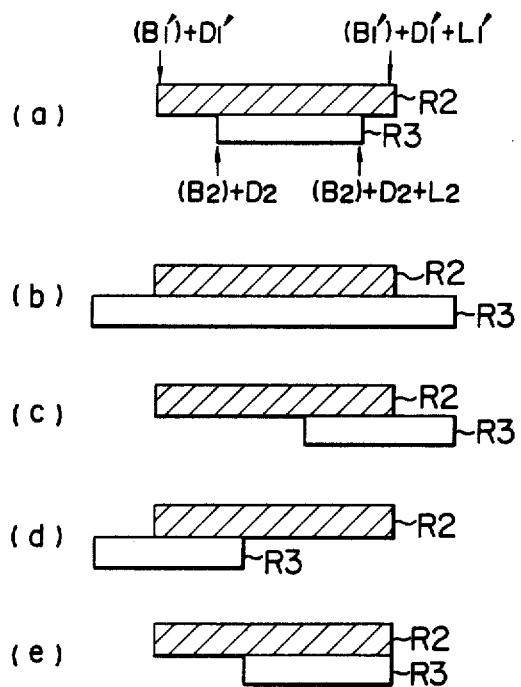
FIGS. 8(a) to (e) are views for illustrating, by way of examples, the operations of the OSC control circuit (11).

Now, the significance of the comparisons mentioned above will be elucidated in more detail with reference to FIG. 8 by taking the comparator circuit 104 as an example. Situations in which the OSC event will possibly take place between a storage location R2 (represented by hatched area) the content of which is to be altered for executing the instruction 2 and a storage location R3 required by the instruction 3 are illustrated in FIG. 8 at (a), (b), (c), (d) and (e), respectively. In the case illustrated at (a) in FIG. 8, the storage location R3 required by the instruction 3 is wholly covered by the storage location R2. On the contrary, in FIG. 8 at (b), the storage location R2 is wholly encompassed by the storage location R3. In FIG. 8 at (c) and (d), there are illustrated situations in which the storage locations R2 and R3 are partially overlapped with each other. The situation shown in FIG. 8 at (e) is a special case of the one shown at (a), wherein the storage location R3 is covered by the storage location R2 and that the right-hand ends of the storage locations R2 and R3 as viewed in the figure are aligned with each other. Since the comparison by the comparator 104 described above results in $B_1' = B_2$, i.e. $(B_1') = (B_2)$ where the parenthesis represents the content of the corresponding register, and $L_1' + D_1' = L_2 + D_2$, it applies valid that $(B_1') + L_1' + D_1' = (B_2) + L_2 + D_2$ and that $L_1' \geq L_2$, indicating thus the situation shown at (e) in FIG. 8.

The output or logical level on the output line 103A (FIG. 7) represents the result of the comparison between the first operand of the instruction 2 and the second operand of the instruction 3. Similarly, the logical level on the output line 105A represents the result of the comparison between the first operand of the instruction 2 and the first operand of the instruction 3. The logical state of the output line 113A represents the result of comparison between the first operand of the instruction 1 and the second operand of the instruction 3, while the logical state of the line 115A represents the result of comparison between the first operand of the instruction 1 and the first operand of the instruction 3.

These results of the comparisons are loaded in the registers 60, 61, 62 and 63, respectively, in synchronism with the stage D of the instruction 3, as will be seen from FIG. 1.

The comparator 104 in the above-described embodiment carries out the comparisons for determining if $L_1' \geq L_2$, $B_1' = B_2$ and $L_1' + D_1' = L_2 + D_2$. The function of the comparators however can be expanded as described below.

Namely, the output 16A of the logical address register 16 in FIG. 1 is loaded in the register 100 in FIG. 7 in place of the base register number $B_1$ and the displacement $D_1$ inputted to the OSC controller 11 in FIG. 7, while the output 17A of the logical address register 17 in FIG. 1 is used in place of the base register number $B_2$ and the displacement $D_2$ inputted to the comparator 104. With this arrangement, the comparator 104 carries out the comparisons for determining if $L_1' \geq L_2$ and $(16A) + L_1' = (17A) + L_2$, where each parenthesis means the contents of a corresponding output signal. In case all these conditions are satisfied, the comparator 104 outputs "1" on the line 104A. Similarly, the output 16A is inputted to the comparator 106 in place of $B_1$ and $D_1$, the output 17A is inputted to the comparator 114 in place of $B_2$ and $D_2$, and the output 16A is inputted to the comparator 116 in place of $B_1$ and $D_1$, so as to carry out similar comparisons. By doing so, it is possible to detect the coincidence of the operand addresses even in the case where the contents of the base registers coincide with each other, though their base register numbers are different. Thus, it is unnecessary to delay the operand reading-out of the instructions even with this arrangement.

Next, at the stage A, the contents of the logical address registers 16 and 17 shown in FIG. 1 are, respectively, supplied to address translation circuits 260 and 270 (shown in FIG. 3) by way of the lines 16A and 17A to be translated into corresponding real addresses which are then loaded in the real address registers 26 and 27, respectively.

An align control circuit 280 serves to determine the number of shifts to be effected by an aligner 36 in dependence on the length code outputted by the register 18 (FIG. 1) on the line 18A and the less significant address part which is not subjected to the address translation and makes appearance on the address line 16A. Similarly, an align control circuit 290 serves to determine the number of shifts to be effected by an aligner 37 in dependence upon the length code of the register 19 appearing on the line 19A and the less significant address part appearing on the address line 17A which does not undergo the address translation. The shift number under consideration will be described by referring to FIG. 5a. In the operand data indicated by a hatched area in FIG. 5a, the rightmost byte address is represented by $(B_i) + D_i + L_i$ (where i = 1, 2), as described hereinbefore, of which the three least significant bits represents the address of the double word boundary. When the value of these three bits is given by x, the rightmost end of the operand data can be aligned with the rightmost end of the eight byte location by shifting the operand data to the right by $(7 - x)$ bytes, as shown FIG. 5a at the lower portion, and subsequently outputted. More particularly, the position of the decimal point is located at the right end in the case of a decimal instruction. Accordingly, the first and second operands 36 and 37 are shifted by the associated aligners 36 and 37, respectively, so that the decimal points of these operands are located at the rightmost position, while the non-requisite portions of the operands are filled with "0s" (which is referred to as the rightward alignment). By performing the rightward alignment for both first and second operands in this manner, the arithmetic operation can be much facilitated, because both operands coincide with each other with respect to the decimal point position.

The numbers of the shifts effected by the align control circuits 280 and 290 are, respectively, placed in registers 28 and 29.

The contents of the length codes appearing on the lines 18A and 19A as well as the contents of the logical addresses on the lines 16A and 17A are also supplied to the OSC detection circuit 20 (shown in FIG. 3) which serves to perform the address comparison of the instant instruction with the preceding one.

Figure 3:
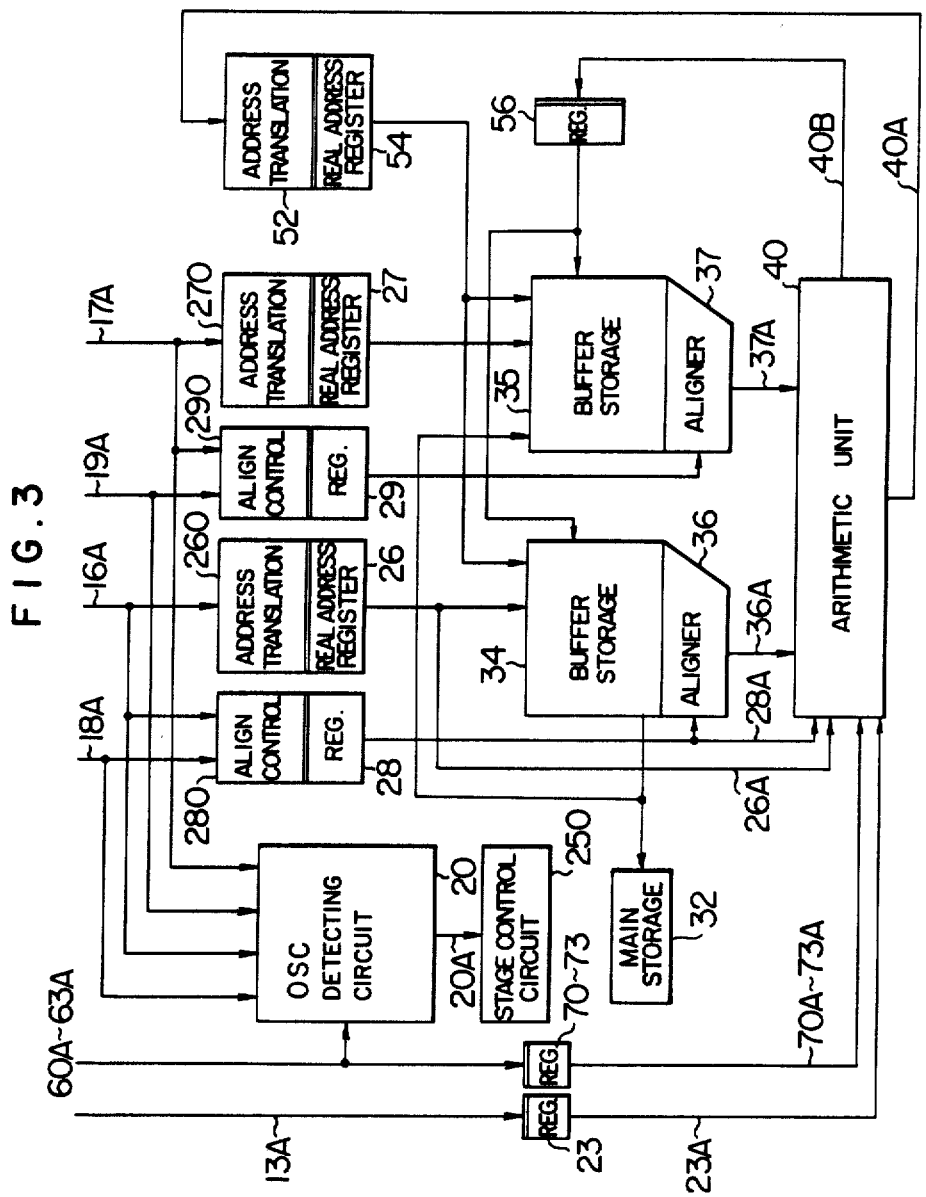
Figure 4:
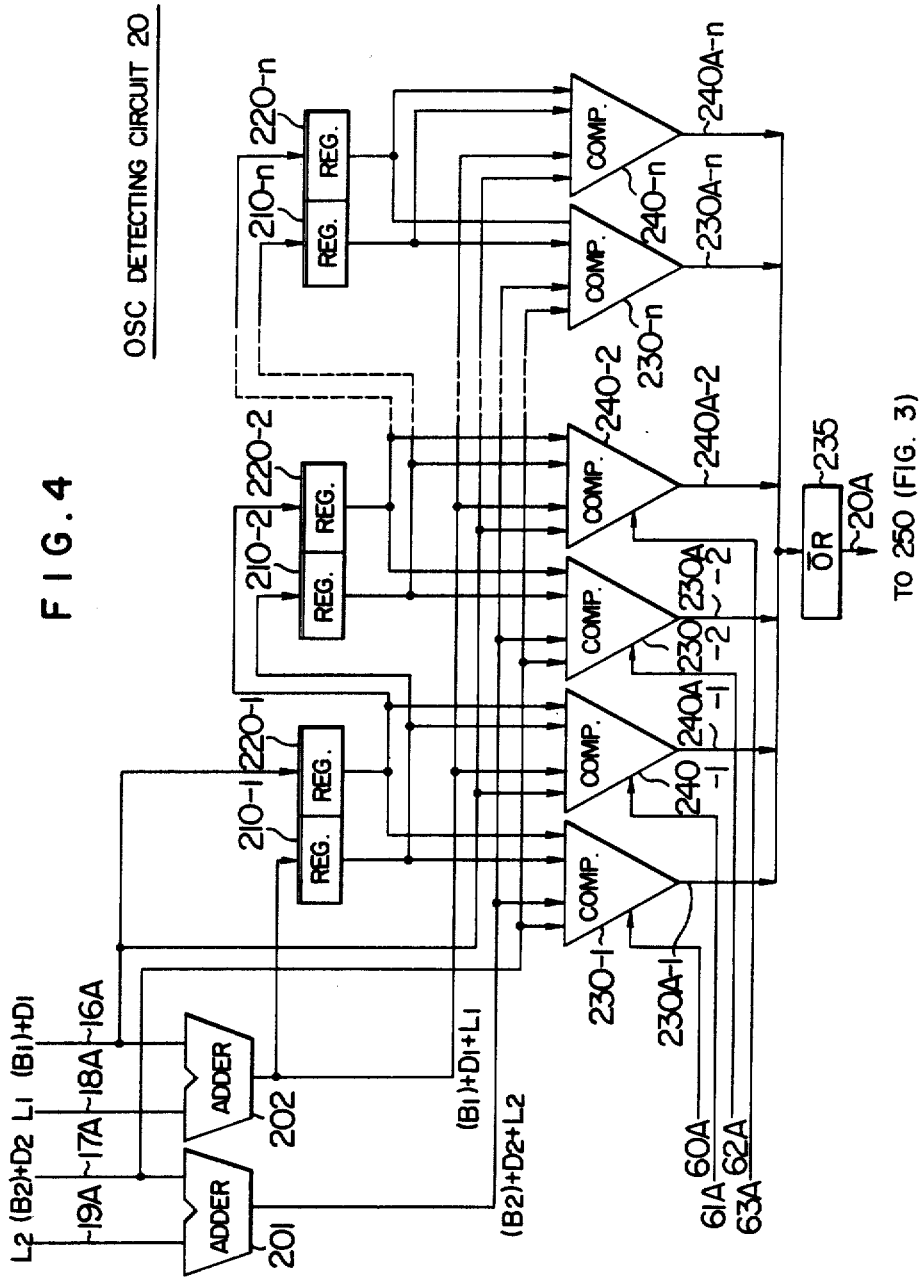
FIG. 4 is a block diagram showing an exemplary circuit configuration of the OSC detecting circuit (20) shown in FIG. 3.

FIG. 4 shows in a block diagram an exemplary embodiment of the OSC detection circuit 20. The lines 16A, 17A, 18A and 19A supply $(B_1)+D_1$, $(B_2)+D_2$, $L_1$ and $L_2$, respectively, to the inputs of adders 201 and 202 to be added together as shown in the figure, wherein $(B_i)+D_i$ and $(B_i)+D_i+L_i$ (where $i=1, 2$) indicate, respectively, the leftmost byte address (leading address) and the rightmost byte address (trailing address) of the operand data to be read or fetched for executing the instant instruction. Among them, $(B_1)+D_1$ and $(B_1)+D_1+L_1$ are, respectively, loaded in registers 220-1 and 210-1 in synchronism with the stage A, the contents of these registers 210-1 and 220-1 are sequentially transferred to registers 210-2 and 220-2, ..., and 210-n and 220-n in synchronism with the stage A. Accordingly, the registers 210-n and 220-n hold, respectively, the leading and the trailing addresses of the storage location of the instruction which precedes the instant one by n. Comparators 230-1 to 230-n and 240-1 to 240-n serve to compare the addresses of these instructions to thereby determine whether the storage location to be read out for the instant instruction should overlap wholly or partially with the storage locations of the preceding instructions. If there exists partial overlap or overlaps between the storage locations in concern, as determined by the comparators, the corresponding output line or lines 230A-1, ..., 230A-n; 240A-1, ..., 240A-n of the comparator(s) are set to logic "1". The output signals of the comparators 230-1~n and 240-1~n are ORed by an OR circuit 235 whose output is applied to the stage control circuit 250 shown in FIG. 3 along a signal line 20A. When the signal line 20A-1 is set to logic "1", i.e. when any one of the output lines 230A-1, ..., 230A-n; 240A-1, ..., 240A-n is set to logic "1", the stage control circuit 250 delays the reading-out of the operands for the instant instruction until the OSC event has been disposed of.

In this case, the OSC control circuit 11 provided according to the teaching of the present invention operates such that when the OSC event has been detected in the manner elucidated above, the contents placed in registers 60, 61, 62 and 63 (FIG. 1) are transmitted to the OSC detection circuit 20 to thereby inhibit the operation of the comparator 230-1, 240-1, 230-2 and 240-2 (FIG. 4), resulting in the outputs of these comparators being logic "0". Thus, the operands for the instant instruction are read out as dummy data. The OSC control circuit 11 (FIG. 1) is designed to detect the situation (e) illustrated in FIG. 8, while the OSC detection circuit 20 (FIG. 3) is adapted to detect all the situations (a), (b), ..., and (e) illustrated in FIG. 8. Accordingly, although the OSC event detected by the OSC control circuit 11 is naturally detected by the OSC control circuit 20, the priority is imparted to the detection by the OSC control circuit 11.

Further, the data on the lines 60A, ..., 63A and the line 13A are, respectively, loaded in the registers 70, ..., 73 and 23 in synchronism with the stage A, as will be seen from FIG. 3.

Next, at the stage L, the operand data is stored in main storage 32 and is accessed with the aid of the real addresses now placed in real address registers 26 and 27 as seen in FIG. 3. Buffer storages 34 and 35 provides a way, with the aid of the real addresses now placed in the real address registers 26 and 27, for directly accessing main storage 32. When an instruction for reading out data from the main storage 32 is executed, buffer storages 34 and 35 are accessed first. If the desired data is not present in buffer storages 34 and 35 the data is fetched from the main storage 32 by the buffer storages 34 and 35 and delivered to the arithmetic unit. On the other hand, when an instruction for writing data in the main storage 32 is executed, the data is first written into the buffer storages 34 and 35 and then written in main storage 32. The data readout from the buffer storages 34 and 35 then undergo positional alignment through the aforementioned rightward aligning procedure with the non-requisite bytes being filled with "0" for convenience of the arithmetic operation, to be subsequently supplied to the arithmetic unit or accumulator 40 through lines 36A and 37A.

Additionally, the contents of the registers 70, 71, 72 and 73 as well as that of the register 23 are also supplied to the accumulator 40 through lines 70A, 71A, 72A and 73A and the line 23A, respectively.

Figure 6:
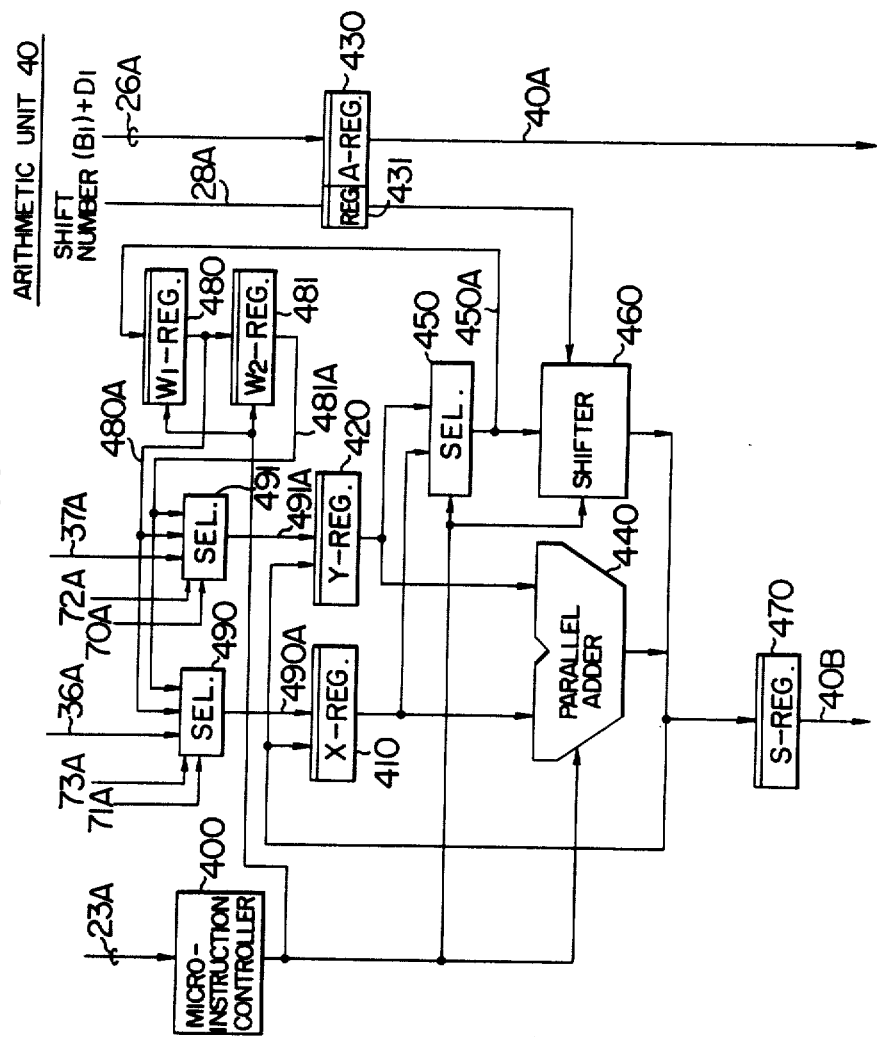
FIG. 6 shows in a block diagram an exemplary embodiment of an accumulator (40) shown in FIG. 3.

An exemplary circuit configuration of the arithmetic unit or accumulator 40 is shown in FIG. 6. Referring to the figure, the leftmost byte address $(B_1)+D_1$ of the real address register 26 is transferred to an A-register 430 through a line 26A. Additionally, a value equivalent to the number of the shifts performed by the aligner 36 for the first operand is loaded in a register 431 through a line 28A. The operation code OP available from the register 23 through a line 23A is supplied to the input of a micro-instruction controller 400. The first and second operand data outputted from the aligners 36 and 37 are, respectively, supplied to selectors 490 and 491 provided according to another aspect of the invention through lines 36A and 37A. The selector 490 serves to select the line 36A for the first operand data when both lines 71A and 73A are at logic "0", while selecting a data line 481A of a W2-register 481 when the lines 71A and 73A are both at logic "0" level. On the other hand, in case the lines 71A and 73A are either logic "1" and "0" or "1" and "1", respectively, a data line 480A of a W1-register 480 is selected. The selected data is then outputted on a line 490A. In a similar manner, the selector 491 serves to select a line 37A for the second operand data when lines 70A and 72A are, respectively, logic "0" while selecting a data line 481A of a W2-register 481 when the states of the lines 70A and 72A are, respectively, logic "0" and "1". On the other hand, in case the line 70A and 72A are either logic "1" and "0" or "1" and "1", respectively, the data line 480A of the W1-register 480 is selected. The selected data is then outputted on a line 491A. The data on the line 490A and 491A are placed in an X-register 410 and a Y-register 420, respectively, in synchronism with the stage L. The significance of the selector mentioned above will be described below.

As mentioned hereinbefore, a decimal instruction is executed, for example, in two cycles at the stage E. In the first cycle, the operation or calculation is executed by a parallel adder 440 for the first and second operand data placed, respectively, in the X-register 410 and the Y-register 420, the result of the operation is re-loaded in the X-register 410. Execution of the operation (addition or subtraction) effected by the parallel adder 440 is controlled by the micro-instruction controller 400.

In the second cycle of the stage E, the X-register 410 is selected by an input selector 450 for the shifter 460 in which the shifting operation is carried out in the direction opposite to that of the shifting in the aligner 36. More specifically, the shifter 460 performs the leftward shifting corresponding to the rightward shifting effected by the aligner 36 as illustrated in FIG. 5b. The result of the operation thus shifted backward is loaded in an S-register 470. The operation of the shifter 460 is controlled by the micro-instruction controller 400 in accordance with the signal indicative of the number of the shifts supplied from the register 431.

The arithmetic unit or accumulator 40 includes the W1-register 480 and the W2-register 481 provided according to an aspect of the present invention. In the second cycle of the stage E, the data on the output line 450A of the selector 450 is loaded in the W1-register 480 whose content in turn is loaded in the W2-register 481 under the control of the micro-instruction controller 400. The W1-register 480 is thus placed with the rightward aligned calculation result such as illustrated at FIG. 5b. This kind of operation is effected once for each instruction. Accordingly, the rightward aligned calculation result for the instruction immediately preceding the instant one is placed in the W2-register 481.

At the stage P, the first operand, i.e. the address information for writing the result of calculation placed in the A-register 430 is supplied to the address translation circuit 52 (FIG. 3) through the line 40A to be translated into the corresponding real address which is then loaded in the real address register 54, as will be seen from FIG. 3. On the other hand, the result of calculation in the S-register 470 is transferred to the register 56 by way of the line 40B (FIG. 3).

Next, at the stage S, the content of the register 56 is written in the buffer storages 34 and 35 at the real addresses designated by the content of the real address register 54. In the foregoing, the individual stages D, A, L, E, P and S have been described in detail.

It should here be mentioned that the rightward aligned operation results for the instructions 2 and 1 are, respectively, placed in the W1-register 480 and the W2-register 481 at the stage L, and that the aforementioned operation of the selector 490 is effected in dependence on the signals on the lines 70A and 71A representative of detection of the OSC event for the instructions 3 and 2 while the operation of the selector 491 mentioned hereinbefore is carried out in dependence on the signals on the lines 72A and 73A representing the result of detection of the OSC event for the instructions 3 and 1. At that time, in case both the lines 71A and 73A are, for example, simultaneously logic "1", that is, when the results of operation for the instructions 1 and 2 are to be used as the first operand data for executing the instruction 3, the line 71A is selected with preference over the line 73A, to thereby allow the operation result of the instruction 2 which is newer data than that of the instruction 1 to be used for the execution of the instruction 3.

It is now assumed, by way of example, that the line 71A is logic "1". This means that the OSC event occurs for the first operands of the instructions 3 and 2. At that time, there makes appearance on the line 36A the first operand data for the instruction 3 which has been rightward aligned by the aligner 36. Since this operand data is the value present before the operation result of the instruction 2 is stored, the calculation can not be executed correctly. Accordingly, in order to allow the operation to be correctly performed, the operation result of the instruction 2 is required to be used as the first operand data for the instruction 3. To this end, the output line 480A of the W1-register 480 is selected by the selector 490. In that case, operation equivalent to that effected by the aligner 36 must be performed. Accordingly, the rightward aligned result of operation is placed in the W1-register 480 with the non-requisite operand positions being filled with zero by the selector 90.

In this way, the result of calculations for the instructions 2 and 1 can be used for the execution of the instruction 3. The transfer of such operation result between the instruction 3 and the succeeding one (e.g. instruction 4) can be effected in a continuous manner by placing the rightward aligned operation result in the W1-register 480 at the stage E of the instruction 3.

The operation stages described so far are illustrated in FIG. 2c on the assumption that the instructions 1, 2 and 3 are decimal addition/subtraction instructions. It will be seen that the initiation of the stages D is delayed by one cycle and instead thereof the stage D' is activated to put the OSC control circuit 11 into operation. In spite of the one-cycle delay of the stage D for the instructions 2, 3 and 4 in this manner, the result of operation can be obtained at the pitch or rate of two cycles, assuring thus the identical performance as the one illustrated in FIG. 2a for the conventional processing device which executes instructions incorporating no OSC.

Since the conventional system or circuit includes neither OSC control circuit 11 nor lines 60A, . . . , 63A, the OSC event detected by the OSC detection circuit 20 can not be suppressed, resulting in the reading or fetching of the operands for the succeeding instruction being inevitably delayed by the stage control circuit 250, as is illustrated in the time chart of FIG. 2b.

The present invention has been described in conjunction with the exemplary embodiment which is assumed to be applied to the decimal instruction. However, it should be appreciated that the invention can be applied to the instruction which requires the rightward alignment for the execution as well as to the SS instruction.

As will be understood from the foregoing description, the result of operation for a preceding instruction can be directly transferred to be used for executing the succeeding instruction interiorly of the arithmetic unit without requiring the aid of the storage when the succeeding instruction requires the operand data stored in at least a part of the storage location which is to be altered by the preceding instruction, the processing of the succeeding instruction can be initiated at an earlier time point, thereby obviating the distance occurring in the hitherto known pipelined processing, whereby overall arithmetic processing can be accomplished at a significantly increased speed, to great advantages.

We claim:

1. A data processing system for processing instructions in a pipelined manner, including processing a preceding instruction which provides for writing of operand data resulting from the processing of said preceding instruction into a first data storage and processing a succeeding instruction which provides for reading of operand data from the first data storage, comprising:

a first data storage;

an operation unit connected to said first data storage said operation unit performing an operation on input data stored in said first data storage;

a second data storage connected to said operation unit for holding operand data resulting from an operation thereby;

first control means, connected to receive instructions in succession, including a first instruction which requires reading of first operand data from a first storage region, of the first data storage, for detecting whether there is a second instruction already under processing which requires writing of second operand data obtained as the result of processing of the second instruction into a second storage region of the first data storage and for detecting a condition when the first storage region is the same as or part of the second storage region said condition being detected by comparing a length and end address of the first storage region as designated by said first instruction and a length and end address of the second storage region as designated by said second instruction; and second control means, connected to said first control means and said second data storage for receiving a signal indicating detection of said condition by said first control means, for transferring the second operand data resulting from the processing of said second instruction from said second data storage to said first control means for use in the processing of the first instruction.

2. A data processing system for processing instructions in a pipelined manner, including processing a preceding instruction which provides for writing of operand data resulting from processing of said preceding instruction into a first data storage and processing a succeeding instruction which requires reading of operand data from the first data storage, comprising:

a first data storage;

an operation unit connected to said first data storage, said operation unit performing an operation on input data stored in said first data storage;

a second data storage connected to said operation unit for holding operand data resulting from an operation thereby;

a first control circuit connected to said first data storage to receive instructions in succession, including a first instruction which requires reading of first operand data from a first storage region of the first data storage, said first control circuit detecting whether there is a second instruction already under processing which requires writing of a second operand data obtained as the result of the processing of the second instruction into a second storage region of the first data storage and detecting a condition when the first storage region is the same as or part of the second storage region, said condition being detected by comparing a length and an end address of the first storage region as designated by the first instruction and a length and an end address of the second storage region as designated by the second instruction, wherein the first instruction requires that the operation unit perform a first arithmetic operation on the first operand data, and wherein the second instruction requires that the operation unit perform a second arithmetic operation on operand data and that resultant data thereof be written into the first data storage as the second operand data; and a second control circuit, connected to said first control circuit and said second data storage, which receives a signal indicating detection of the presence of the second instruction and detection of said condition by said first control circuit said second control circuit transmits the second operand data resulting from said second arithmetic operation and held by the second data storage to said operation unit for use in processing of the first arithmetic operation.

3. A data processing system according to claim 2, wherein the first control circuit has means for detecting the presence of the second instruction under a further condition that a first one of two ends of the first storage region coincides with a corresponding one of the two ends of the second storage region.

4. A data processing system according to claim 3, wherein the beginning of the end of the first storage region and the corresponding beginning of the end of the second storage region respectively differ from an end of the first storage region corresponding to the end address designated by the first instruction and an end of the second storage region corresponding to the end address designated by the second instruction.

5. A data processing system according to claim 4, wherein said first data storage provides whole data located in a region between two adjacent address boundaries which region includes a storage region having an end address and length as designated by an applied instruction among predetermined address boundaries;

and further including an aligner circuit connected to said first data storage and responsive to said end address for shifting the data read from said region in a first direction by an amount which is dependent upon the different between one of the two address boundaries of the region and the end address designated by the instruction and for providing the shifted data to said operation unit, and a shifter connected to an output of the operation unit for shifting output data of the operation unit by said amount in a second direction opposite to said first direction and for providing the shifted data to said first data storage to be stored therein;

said second data storage comprising at least one data register connected to the output of the operation unit for holding the output data thereof; and the second control circuit comprises a select circuit connected to the data register for providing the data held thereby as the first operand in response to the detection of the second instruction by said first control circuit.

6. A data processing system according to claim 2 wherein the first control circuit includes a plurality of registers connected in series for holding instructions sequentially received, an instruction in each register being shifted to a next register in accordance with the progress of processings for the instruction and a new instruction being supplied to the starting one of the registers in synchronism with the shift operation, and a compare circuit connected to said plurality of registers and responsive to the first instruction for detecting whether or not the second instruction is present among the instructions held by said plurality of registers and for providing a control signal which indicates which one of the registers holds the second instruction;

wherein the second data storage includes a plurality of serially-connected data registers, the starting one of which is connected to receive output data of an operation unit included in the data processing system in synchronism with outputting of the output data and means for shifting the content of each data register to a next one of the data registers as each output data is produced by the operation unit; and wherein said second control circuit includes a select circuit connected to said data registers and said compare circuit for selectively providing the content of that one of said data registers indicated by said control signal.

7. A data processing system for processing instructions in a pipelined manner, comprising:

a first data storage;

an operation unit, connected to said first data storage and responsive to the instructions applied in succession from said first data storage, for performing an operation designated by each instruction on an operand data signal supplied thereto so as to provide a result data signal corresponding to the result of the operation;

access means, connected to said first data storage responsive to each of the instructions requiring supply of an operand data signal from said first storage means to said operation unit, for reading the operand data signal from a storage region within said first data storage and for writing the result data signal into a storage region within said first data storage having an end address and length both designated by said each instruction;

a second data storage connected to said operation unit for temporarily holding a result data signal provided by said operation unit for the instructions;

a first control circuit connected to said first data storage and responsive to said each instruction requiring reading of the operand data signal from a first storage region of said first data storage among the instructions, said first control circuit detecting whether there is a second instruction which is already under processing and which requires writing of a result data signal provided by said operation unit into a second storage region within said first data storage, said detecting being done by comparing an end address and length of said first storage region both designated by the first instruction and an end address and length of said second storage region both designated by said second instruction; and a second control circuit connected to said first control circuit and said second data storage for receiving a signal indicating a detection of the presence of the second instruction, said second control circuit transmits a result data signal provided by said operation unit for the second instruction and held by said second data storage to said operation unit as an operand data signal for said each instruction instead of fetching the operand data signal from the first storage region by said access means after the result data signal for the second instruction is written into the second storage region.

8. A data processing system according to claim 7, wherein an edge address of the first storage region coincides with a corresponding edge address of the second storage region and the length of the first storage location is smaller than or equal to length of the second storage region.

9. A data processing system for processing instructions in parallel, including processing a preceding instruction which provides for writing of operand data resulting from the processing of said preceding instruction into a first data storage and processing a succeeding instruction which provides for reading from the first data storage at least part of the operand data produced as a processing result in the processing of said preceding instruction, comprising:

said first data storage, wherein said first data storage is read in response to receipt of an operand address indicative of one of two boundaries of the storage region, said operand address being provided by a first control means;

a second data storage connected to receive data produced as a processing result in the processing of an instruction;

said first control means, connected to receive instructions in succession, including a first instruction which requires reading of first operand data from a first storage region of the first data storage, for detecting whether there is a second instruction already under processing which requires writing of second operand data into a second storage region of the first data storage and for detecting a condition when the first storage region designated by the first instruction to supply the first operand data is the same as or part of the second storage region designated by the second instruction to receive the second operand data, said condition being detected by comparing length data indicating the length of the operand data and an operand address indicative of one of two boundaries of the storage region of said first data storage designated by each of the first and second instructions; and second control means, connected to said first control means and said second data storage which receives a signal indicating detection of said condition by said first control means, said second control means transmits the second operand data resulting from processing said second instruction from said second data storage to said first control means for use in the processing of the first instruction.

10. A data processing system according to claim 9, further comprising:

an operation unit connected to said first data storage and said second data storage for processing data stored therein, and wherein the first instruction requires that the operation unit perform a first arithmetic operation on the first operand data, while the second instruction requires that the operation unit perform a second arithmetic operation and the resultant data thereof be written into the first data storage as the second operand data, said second data storage being connected to receive output data of said operation unit, and said second control means including means responsive to the detection by said first control means for providing said operation unit with said second operand execution of the second arithmetic operation and stored in said second data storage, so that said operation unit performs the first arithmetic operation on the provided second operand data; and wherein the first control means has means for detecting the presence o the second instructions under a further condition that a first one of two boundaries of the first storage region coincides with a corresponding one of the two boundaries of the second storage region.

11. A data processing system according to claim 10, wherein said first data storage provides data located in a region between two adjacent address boundaries, one of which is identified by an applied read address designated by an applied instruction among predetermined address boundaries;
   a further including an aligner circuit connected to said first data storage and responsive to said applied instruction for shifting the data read from said region in a first direction by an amount which is dependent upon the difference between one of the two address of said applied region and one of two boundary addresses of a storage region designated by the instruction and for providing the shifted data to said operation unit, and a shifter connected to an output of the operation unit for shifting output data of the operation unit by said amount in a second direction opposite to said first direction and for providing the shifted data to said first data storage to be stored therein;
   said second data storage comprising at least one data register connected to the output of the operation unit for holding the output data thereof; and
   the second control means comprises a select circuit connected to the data register for providing the data held thereby as the first operand in response to the detection by said first control means.

12. A data processing system according to claim 9, wherein the first control means includes a plurality of registers connected in series for holding instructions sequentially received, an instruction in each register being shifted to a next register in accordance with the progress of processings for the instruction and a new instruction being supplied to the starting one of the registers in synchronism with the shift operation, and a compare circuit connected to said plurality of registers and responsive to the first instruction for detecting whether or not the second instruction is present among the instructions held by said plurality of registers and for providing a control signal which indicates which one of the registers hold the second instruction;
   wherein the second data storage includes a plurality of serially-connected data register, the starting one of which is connected to receive output data of an operation unit included in the data processing system in synchronism with outputting of the output data and means for shifting the content of each data register to a next one of the data registers as each output data is produced by the operation unit; and
   wherein said second control includes a select circuit connected to said data registers and said compare circuit for selectively providing the content of that one of said data registers indicated by said control signal.

* * * * *